F. E. FORSTER.
Fishing-Lines.
No. 135,900.
Patented Feb. 18, 1873.
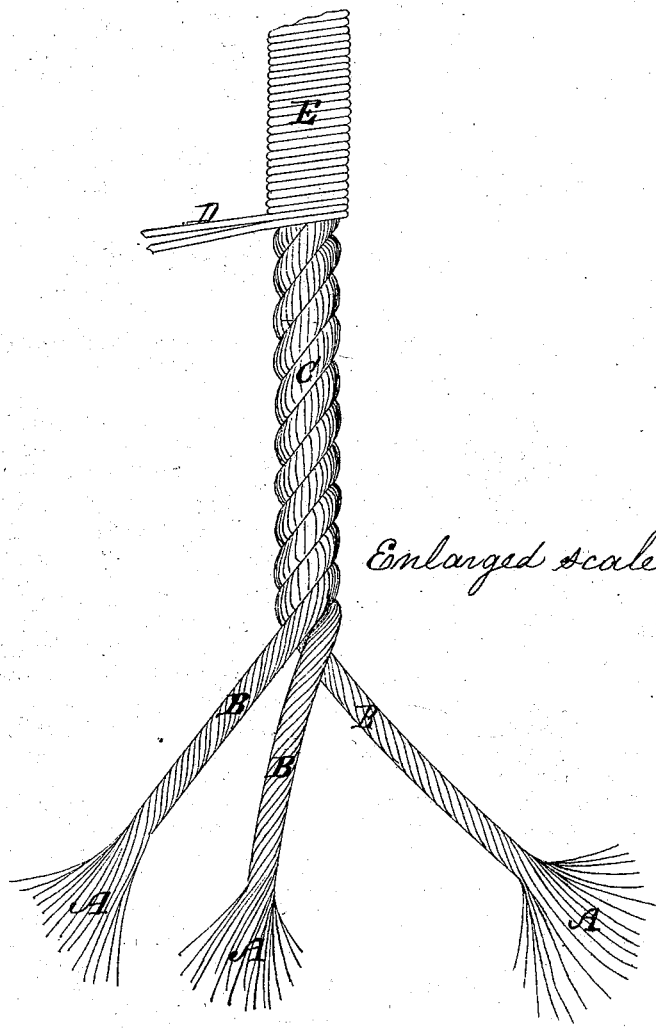
Enlarged scale
Witnesses:
Albert G. Forster
Arthur Neill
Inventor:
Ferdinand E. Forster

UNITED STATES PATENT OFFICE.

FERDINANDO E. FORSTER, OF NEW YORK, N. Y.

IMPROVEMENT IN FISHING-LINES.

Specification forming part of Letters Patent No. 135,900, dated February 18, 1873.

*To all whom it may concern:*

Be it known that I, FERDINANDO E. FORSTER, of the city, county, and State of New York, have invented an Improved Gimp-Gut for Fishing Purposes, of which the following is a specification:

My invention relates to a fishing-line; and consists in a line having a body of floss silk, made from about eighty-four ends, comprising three strands, which are twisted separately and then twisted together, after which operation the cord so formed is covered with twist silk, and next the whole is saturated or steeped in a bath of balsam of fir, which renders it impervious to water, and in which it is allowed to remain for about a week. It is next taken out of the bath, the surplus balsam of fir is removed and allowed to dry; and, when properly dried, the line is ready for use.

The accompanying drawing illustrates the line while being manufactured, in which A indicates the floss silk; B, the twisted strands; C, the cord made from the twisted strands; D, the silk-twist covering; and E, the line.

What I claim, and desire to secure by Letters Patent, is—

As a new article of manufacture, a fishing-line made from silk, covered and saturated as described.

FERDINANDO E. FORSTER.

Witnesses:
ALBERT G. FORSTER,
ARTHUR NEILL.